US007488246B2

(12) United States Patent
David

(10) Patent No.: US 7,488,246 B2
(45) Date of Patent: Feb. 10, 2009

(54) SUPER ROYAL VIDEO POKER

(76) Inventor: Ira W. David, 2549 Thornview St., Las Vegas, NV (US) 89135

( * ) Notice: Subject to any disclaimer, the term of this patent is extended or adjusted under 35 U.S.C. 154(b) by 555 days.

(21) Appl. No.: 11/018,526

(22) Filed: Dec. 21, 2004

(65) Prior Publication Data

US 2006/0135239 A1 Jun. 22, 2006

(51) Int. Cl.
*A63F 13/00* (2006.01)

(52) U.S. Cl. .......................................................... 463/13

(58) Field of Classification Search ............. 463/13–20, 463/42

See application file for complete search history.

(56) References Cited

U.S. PATENT DOCUMENTS 5,042,818 A 8/1991 Weingardt
5,356,140 A 10/1994 Dabrowski et al.
5,732,950 A 3/1998 Moody
5,803,809 A * 9/1998 Yoseloff ...................... 463/13
5,823,873 A 10/1998 Moody
6,007,066 A 12/1999 Moody
6,098,985 A 8/2000 Moody
6,220,959 B1 4/2001 Holmes, Jr. et al.
6,322,445 B1 11/2001 Miller
6,517,074 B1 2/2003 Moody et al.
6,561,898 B2 5/2003 Moody

* cited by examiner

*Primary Examiner*—Scott E Jones

(57) ABSTRACT

The player is randomly dealt an initial poker hand, optionally of five cards, from a composite deck formed from two or more subdecks of cards. The player decides which of the initial cards to discard, if any, retaining the remaining cards from the dealt hand. The player receives replacement cards to replace the discarded cards. The player's final poker hand consists of the player's retained cards and the dealt replacement cards. The dealer evaluates the poker hand so reconstituted against a prespecified payoff table, and the player loses the game wager or receives a reward, as indicated in that payoff table. The payoff table determines the reward for a final hand based on the combination of suit, value, and source subdeck of the cards comprising that final hand.

10 Claims, 4 Drawing Sheets

Front View of Gaming Device for Play of Super Royal Poker
After Replacement

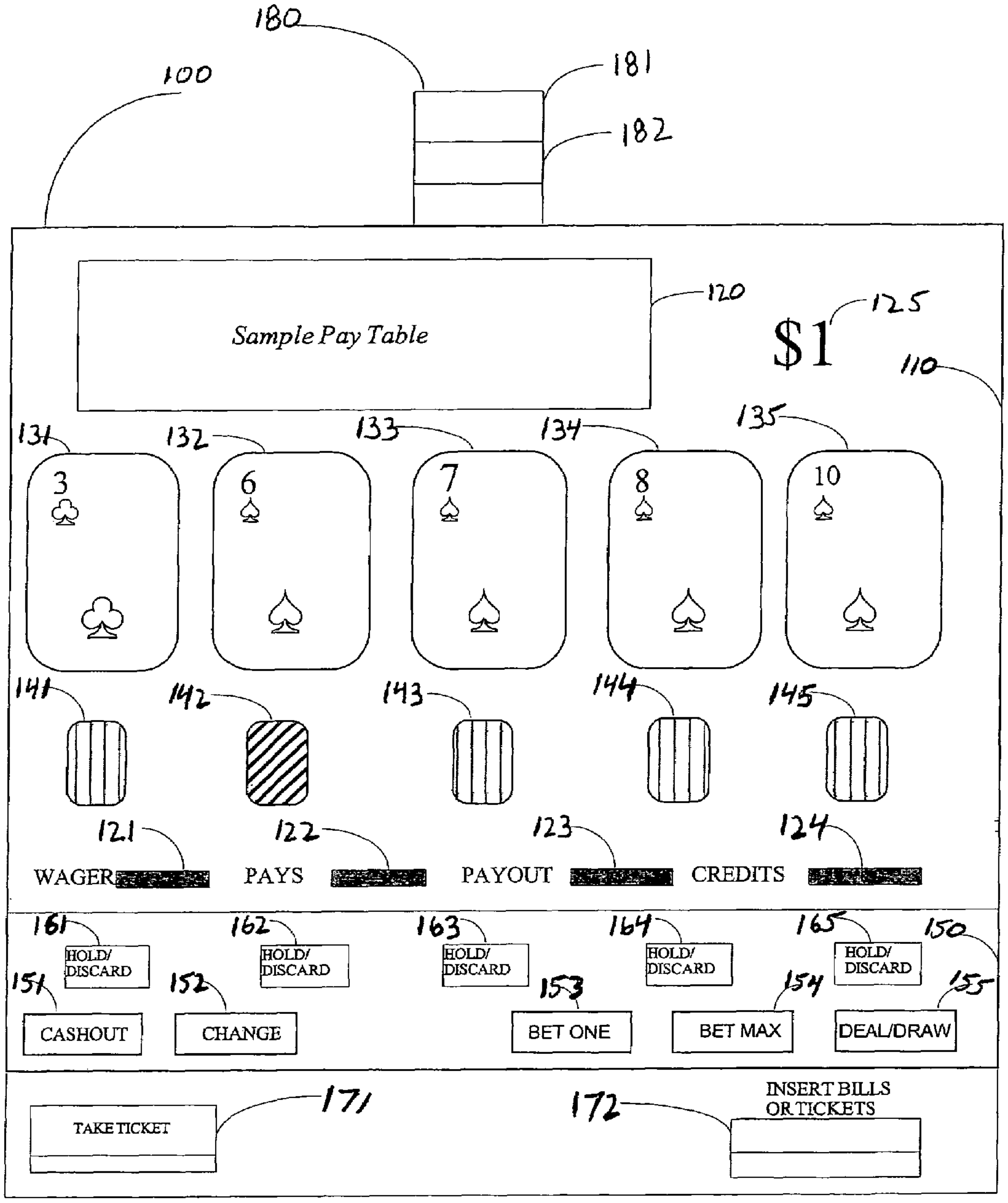
FIGURE 1 - Front View of Gaming Device for Play of Super Royal Poker Before Replacement

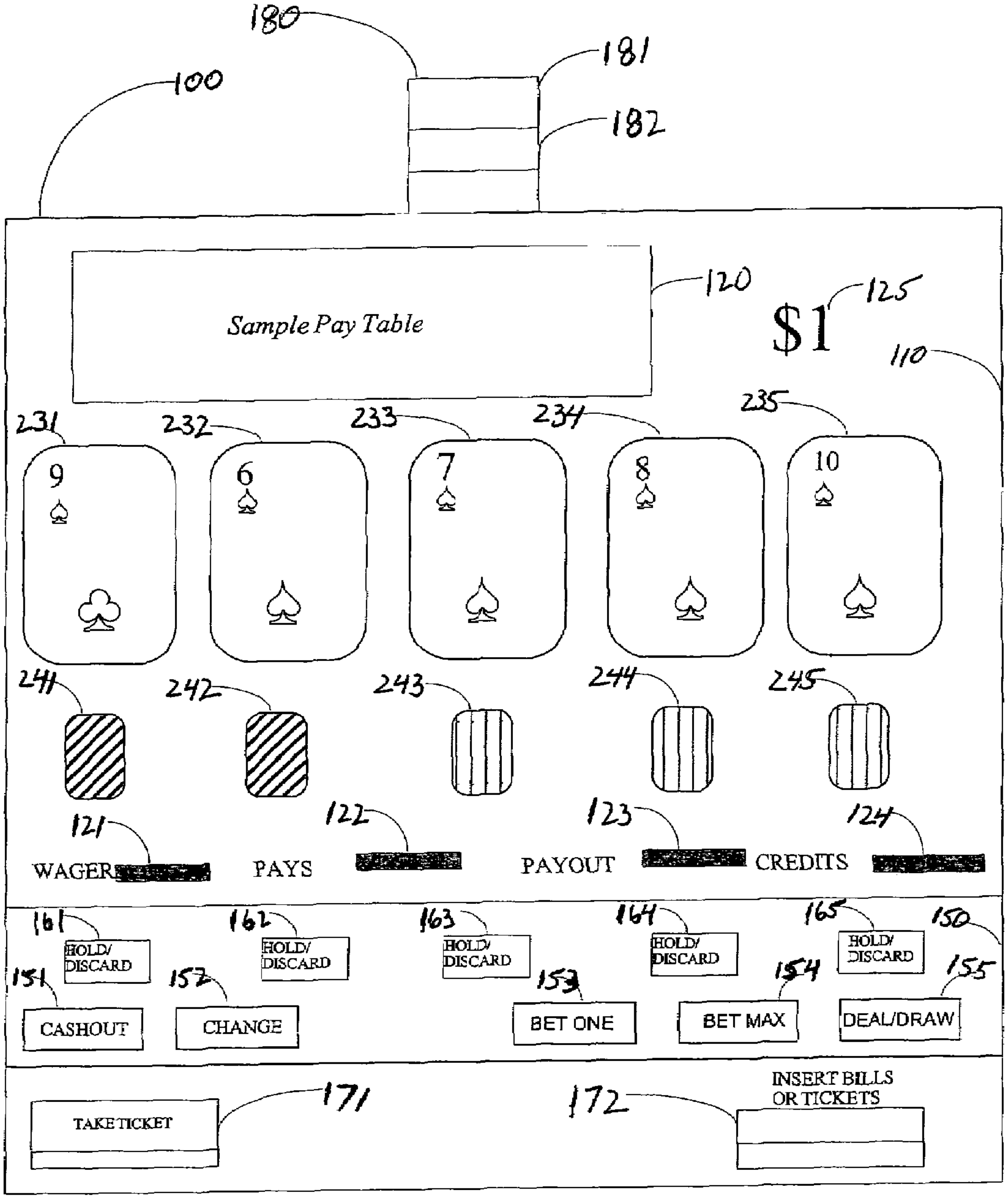
FIGURE 2 - Front View of Gaming Device for Play of Super Royal Poker After Replacement 200 210 220

| FINAL HAND | PAYOUT VALUE |
|---|---|
| SUPER ROYAL FLUSH | 10,000 |
| SUPER STR. FLUSH | 1,000 |
| ROYAL FLUSH | 800 |
| 5-OF-A-KIND | 90 |
| STRAIGHT FLUSH | 50 |
| 4-OF-A-KIND | 10 |
| FULL HOUSE | 6 |
| FLUSH | 5 |
| STRAIGHT | 4 |
| 3-OF-A-KIND | 2 |
| TWO PAIR | 1 |
| JACKS OR BETTER | 1 |
| LOSING HAND | 0 |

FIGURE 3 - OPTIONAL PAY TABLE

| FINAL HAND | JACKS-OR-BETTER | SUPER ROYAL POKER |
|---|---|---|
| SUPER ROYAL FLUSH | N/A | 10,000 |
| SUPER STR. FLUSH | N/A | 1,000 |
| ROYAL FLUSH | 800 | 800 |
| 5-OF-A-KIND | N/A | 90 |
| STRAIGHT FLUSH | 50 | 50 |
| 4-OF-A-KIND | 25 | 10 |
| FULL HOUSE | 9 | 6 |
| FLUSH | 6 | 5 |
| STRAIGHT | 4 | 4 |
| 3-OF-A-KIND | 3 | 2 |
| TWO PAIR | 2 | 1 |
| JACKS OR BETTER | 1 | 1 |
| LOSING HAND | 0 | 0 |

FIGURE 4 - COMPARISON TO TRADITIONAL JACKS-OR-BETTER PAYOUT

SUPER ROYAL VIDEO POKER

FIELD OF THE INVENTION

The present invention relates to the field of card games. Specifically, the present invention is a method and device for improved video poker game, utilizing a super deck of playing cards consisting of two or more distinct subdecks of playing cards, in which players are dealt a five card hand, may discard from zero to five of those cards, and receive a like number of replacement cards. The resultant five card hand is then compared against a prespecified payoff table and the player is paid, or loses his game wager, accordingly. The payoff table takes into account the source deck of cards as well as their suit and value.

BACKGROUND OF THE INVENTION

The many variations of video poker have proven extremely popular with gamblers, and extremely popular for the casinos which offer them. One of the constant searches is for a method which allows for a higher potential player win, without greatly affecting the house profit. It is with this goal in mind that variations such as progressive jackpots have been implemented, as well as multi-hand games and reversible royals. Each of these provides a possible high jackpot for the player, but maintains the house advantage by reducing the payout for some of the lesser hands.

Most such games, however, do not allow for a jackpot paying much more than the 800-to-1 odds of the Royal Flush, at least not on an independent basis, i.e. other than the progressives. In addition, lowering the payouts on the lesser hands is often viewed negatively by players who have learned to expect the smaller payouts to keep them funded for more play. A way is needed to accomplish both.

Poker is essentially based on the two-dimensional nature of the playing card deck, with four suits and thirteen values. The deck may, in fact, be seen as a 4×13 matrix, and most poker hands may be seen as being based on the relationships between cards held in this matrix structure. For example, if we look at the matrix as being four columns wide, by thirteen rows, a flush is all five cards in a column, a straight is one card in each of five consecutive rows, a full house is three cards in one row and two in another, a royal flush is the top five cards in a column, etc.

By allowing video poker to deal cards from a superdeck consisting of more than one visually distinct subdeck, and by implementing payouts which depend on the subdecks from which a card was obtained as well as the suit and value of the card, the super payout can be accomplished without loss of lower payouts. Using two subdecks decreases the probability of column hands, i.e. straights, flushes, straight flushes and royal flushes, while increasing that of "row" hands, hands based on multiple cards of equal value, three-of-a-kind, full house, four-of-a-kind, five-of-a-kind (which here becomes possible without wild cards), and even pairs. However, the changes to the row hands are not so great as to require more than minimal adjustment in the payoff tables, and the decreased potential of the column hands allows the addition of a jackpot for a super royal, a royal flush with all five cards being from the same deck. In the examples provided below, the super royal may pay at least ten-thousand-to-one, which is more than twelve times as much as the standard royal on other video poker machines. See comparison to standard jacks-or-better depicted in FIG. 3.

SUMMARY OF THE INVENTION

The method of the present invention is a card game, played with a superdeck of playing cards consisting of a plurality of visually distinctive subdecks of cards, each subdeck substantially equivalent to a deck of playing cards or a subset thereof, played against the house and a pre-specified payoff table. Payoffs are based on suit, value, and source subdeck of the cards constituting a hand. Players indicate their desire to participate by placing a game wager. Once the wager is placed, the play of the hand may commence. While the embodiment illustrated is based upon a unit of wager fixed for a given gaming machine, in an alternate optional embodiment, a player would be able to select or alter this unit of wager.

The player receives an initial hand of cards, randomly distributed, without replacement, from a superdeck of cards consisting of a plurality of subdecks of cards. In the optional embodiment illustrated, two visually distinct subdecks of cards are used, and the hand consists of five cards.

Upon examining the initial hand, a player selects which cards to hold, or retain, and which cards to discard. In the optional embodiment illustrated, players may discard any or all cards, or even no cards. Also in the optional embodiment illustrated, players indicate the cards to be retained through the use of "hold" keys provided under each card on the play device. Cards not held are to be discarded. At the completion of the designation of held cards, the player requests a "draw" to replace the discarded cards. Such replacement cards are randomly distributed, without replacement, from the cards not used in the distribution, or deal, of the initial hand.

Once each player's final hand is so determined it is then compared against a prespecified payoff table, which table includes payoffs based on source subdeck as well as card suit and value. The payoff so determined directs whether a player loses his or her wager, pushes (neither wins nor loses), or wins an indicated multiple of the initial game wager. The device collects wagers and pays winnings as indicated. After all wagers are completely dealt with, the device is available for play of the next hand.

BRIEF DESCRIPTION OF THE DRAWINGS

FIG. 1 is a front view of a layout of a gaming device for play of a card game before card replacement, according to an optional embodiment of the present invention;

FIG. 2 is a front view of a layout of a gaming device for play of a card game after card replacement, according to an optional embodiment of the present invention;

FIG. 3 is a sample payoff table which may be used to determine player wager outcomes; and FIG. 4 is a comparison of the probabilities and payoffs in the traditional jacks-or-better version of video poker and the present invention.

DESCRIPTION

Reference is now made to the figures wherein like parts are referred to by like numerals throughout, and referring in particular to FIGS. 1 and 2, an optional gaming device 100 for play of a card game according to an optional embodiment of the present invention. The device 100 consists of three sections, a display section 110, a player control section 150, and indicator lights 180 mounted on top.

The display section 110 includes a display of the payoff table 120 for easy player reference, displays of the faces of cards in play before replacement 131-135, the backs or source subdecks of the cards in play before replacement 141-145, the faces of cards in play after replacement 231-235, the backs or source subdecks of the cards in play after replacement 241-245, the current wager 121, the payout 122 for the hand just completed, the payout 123 when a player cashes out, the credits 124 available for play, and the basic unit of wager, or minimum wager 125. In the optional embodiment illustrated, the face of the card 131-135, 231-235, depicting suit and value is displayed separately from the back of the card 141-145, 241-245. In an alternate embodiment, these may be combined into a single set of displays each of which depicts the suit, value, and source subdeck of a card.

The player control section 150 includes control buttons to indicate cards to Hold or Discard 161-165, a Cashout request button 151, a Change, or call attendant, button 152, a "Bet One" button 153 to bet one or raise the game wager by one unit, a "Bet Max" button 154 to wager the maximum allowed for the machine, a "Deal/Draw" button 155 to indicate that the player has completed making selections of wager or hold/discard requests, a device to handle wagers such as a receiver 172 for either ticket voucher or cash form, and a device to issue payouts, such as a printer to print cash out ticket vouchers 171 for players desiring to cash out.

The indicator lights 180 have two lighted sections visible over the top of the device 100 and other, adjacent, devices. The lower lighted portion 182 is a color-coded indicator of the basic unit of wager 125 allowed for the device 100. The upper lighted portion 181 is a signal device should the player require assistance.

To commence a wagering session, or between hands during a wagering session, the player increments the available wager credits 124 available for game wagers by inserting wager credits through the receiver 172. Such credits may be in the form of cash in acceptable denominations, or ticket vouchers.

To commence play, a player selects a game wager 121, either through one or more pressings of "Bet One" 153, or a single pressing of "Bet Max" 154. In the optional embodiment illustrated, the maximum bet is set to five times the basic wager (nickel, quarter, dollar, etc.). In the optional embodiment illustrated, the device is preset for the basic wager. In an alternate embodiment, the player may select the basic wager prior to commencement of any hand.

If the game wager selected reaches the maximum wager allowed, the initial deal is automatically started. If the player wishes to bet less, the player presses the Deal/Draw button 155 when the game wager is set to the desired amount. If the player wishes to repeat the same game wager as the previous hand, the player may simply press the Deal/Draw button 155. The game wager 121 is not permitted to exceed the credits available 124.

As the game wager 121 changes, the payout table display 120 changes to reflect potential payouts for the current game wager 121 as well as the maximum wager permitted.

When the initial deal begins, the game wager selected 121 is subtracted from the credits available 124.

The device randomly selects a hand of cards, in the optional embodiment illustrated consisting of five cards, without replacement, from a composite deck or "superdeck" of cards consisting of a plurality of subdecks, or electronic representations thereof. The face of the first card selected 131 is displayed as is the back of the card 141, indicating the source subdeck from which this card was selected. Similarly, the faces of the rest of the cards selected 132-135 are displayed, as are their backs, 142-145.

In the optional embodiment illustrated, the composite deck from which cards are selected consists of two subdecks, each consisting of a standard poker deck, with visually distinguishable back designs. In alternate embodiments, the composite deck may consist of more or less cards or electronic representations thereof, and subdecks may consist of non-null subsets of the basic deck, where a full deck is considered a complete subset. For example, in optional embodiments, the composite deck may consist of one full basic deck, plus an additional deck containing all spades, or all cards between ace and ten. Such a composite deck may therefore have multiple occurrences of the same suit/value combination, such multiple occurrences distinguishable by source deck or subdeck.

The player reviews the initial hand and determines cards to be discarded, and cards to be held, or retained. In the preferred embodiment illustrated, players may discard zero, one, two, three, four, or five cards, thereby retaining five, four, three, two, one, or zero cards, respectively. Players indicate desired disposition of cards through the use of the Hold/Discard buttons 161-165. Pressing a Hold/Discard button 161-165 changes the disposition of the card 131-135, 141-145 directly above it from Hold to Discard, or Discard to Hold. As each card has both face 131-135 and back 141-145, the two are representations of the same card, and held or discarded together. The player indicates completion of the Hold/Discard decision by pressing the Deal/Draw button 155.

The device removes the designated discarded cards from the display 131-135, 141-145, and replaces each card so removed with a new card selected randomly, without replacement, from the previously undealt cards of the composite deck. Replacement cards so selected are displayed in the display section 110 of the device 100, in the vacated locations 231-235, 241-245, displaying both the faces 231-235, and the backs 241-245. For held cards, the positions before replacement 131-135, 141-145 will be the same as the positions after replacement 231-235, 241-245. The retained cards and replacement cards 235, 241-245, constitute the final hand.

The device compares the final hand against the payoff table 120, determining the payoff 122, if any. Referring to the optional embodiment of the payoff table 200 depicted in FIG. 3, the device compares the final poker hand achieved by the player 231-235, 241-245 with the hands 210 listed in the table 200. For the corresponding hand described 210, the payout value 220 is added to the counter of available credits 124. The device is now available for commencement of the next hand.

While FIG. 3 illustrates a payout table for the optional embodiment illustrated, in alternate embodiments the payoff table could raise or lower individual hand value, change their order, or modify the list of hands to receive rewards.

At any point between play of hands, the player may commence the next hand as indicated above, add additional wager credits 124 as indicated above, or terminate the gaming session by "cashing out" remaining wager credits 124, if any. To indicate the desire to "cash out," the player presses the Cashout button 151. Any remaining wager credits 124 are then dispensed to the player through the ticket printer 171. Tickets so printed may be redeemed by the house for cash, or may used in subsequent play of this or other automated wagering devices 100.

At any point, the player may request personal assistance, including but not limited to requesting currency conversion, typically from large denomination currency into currency of smaller denomination, by pressing the "Change" button 152. Pressing this button 152 once causes the signal light 181 on top of the device 100 to flash. Pressing this button 152 a second time causes the signal light 181 on top of the device 100 to cease flashing.

While certain embodiments of the present invention have been shown and described it is to be understood that the present invention is subject to many modifications and changes without departing from the spirit and scope of the claims presented herein.

I claim:

1. A method for conducting a card game for one or more players using playing cards, or electronic representations thereof, comprising:

providing a composite deck of playing cards including a plurality of visually distinct subdecks of playing cards commingled with one another, the playing cards of each subdeck including a visually distinguishable subdeck identifier, each subdeck formed from at least a subset of a standard poker deck;

defining a payoff table of winning hands and associated payoffs, said payoff table including at least one winning hand distinguished from other winning hands based on the subdeck identifiers of the playing cards forming said winning hand;

receiving a game wager from each player;

dealing an initial hand of playing cards randomly selected from the commingled subdecks of playing cards included in said composite deck;

receiving from each player a selection to discard zero or more playing cards from said player's initial hand;

dealing a replacement playing card for each playing card selected for discard, said replacement cards dealt randomly from the commingled subdecks of playing cards in said composite deck depleted of the previously-dealt playing cards;

forming a final player hand for each player, said final hand consisting of the playing cards of said initial hand, excluding said cards selected for discard and including said replacement cards;

comparing each player's final hand to said payoff table, including comparing the subdeck identifiers of the playing cards in said final hand to the subdeck identifiers for said winning hands in said payoff table; and rewarding each player having a winning hand with the payoff associated with said winning hand in said payoff table.

2. The method of claim 1 wherein each playing card includes a face identifying the rank and value of the playing card and a back and wherein said subdeck identifier includes a visually distinct design on the back of each playing card forming said subdeck.

3. The method of claim 1 wherein each subdeck consists of a standard poker deck of fifty-two playing cards.

4. The method of claim 1 wherein each subdeck consists of a standard poker deck of fifty-two playing cards, supplemented with at least one joker.

5. The method of claim 1 wherein each initial hand includes five playing cards and each player may select up to five playing cards for discard from the player's initial hand.

6. The method of claim 5 wherein the game is conducted using a first subdeck and a second subdeck randomly commingled with one another, each of said first subdeck and said second subdeck including a standard poker deck of playing cards, wherein the playing cards from said first subdeck are visibly distinct from the playing cards from the said second subdeck.

7. The method of claim 1 wherein said payoff table includes payoffs for winning hands in which all playing cards comprising said winning hand are from the same subdeck of playing cards.

8. The method of claim 1 wherein each subdeck of playing cards has at least one wild card, wherein said wild card may substitute for other playing cards from said composite deck in a player's hand.

9. A device for conducting an enhanced game of video poker for a player, comprising:

a data processor;

a display communicating with said data processor;

an input device communicating with said data processor;

a wager handling device communicating with said data processor, said wager handling device adapted to receive game wagers from said player and transmit a signal verifying receipt of said game wager to said data processor;

a data storage device storing an electronic representation of a composite deck of playing cards including a plurality of visually distinct subdecks of playing cards commingled with one another, the playing cards of each subdeck including a visually distinguishable subdeck identifier, each playing card including a face identifying the suit and value of said playing card and a back identifying the subdeck identifier of said playing card, each subdeck formed from at least a subdeck of a standard poker deck;

said data structure further storing a wager field, a register of available credits, a payoff table of winning hands and associated payoffs, said payoff table including at least one winning hand distinguished from other winning hands based on the subdeck identifiers of the playing cards forming said winning hand, and instructions executable by said processor for executing a method comprising:

displaying said wagering field at said display;

receiving input from said player through said wager handling device representing the player's game wager;

deducting said game wager from said amount available at said register of available credits;

in response to a signal from said wager handling device indicating receipt of said game wager, said data processor dealing an initial hand of playing cards randomly selected from the commingled subdecks of playing cards included in said composite deck;

displaying said initial hand at said display, wherein the face and back of each playing card of said initial hand is displayed;

receiving through said input device said player's selection to hold or discard each playing card of said initial hand;

removing from said display of said player's hand all playing cards selected for discard;

dealing replacement cards for each playing card selected for discard, said replacement cards randomly selected from the commingled subdecks of playing cards included in said composite deck;

forming a final hand from said playing cards selected to be held and said replacement cards;

comparing said final hand to said payoff table, including comparing the subdeck identifiers of the playing cards in said final hand to the subdeck identifiers for said winning hands in said payoff table;

if said final hand is a winning hand, said data processor rewarding said player by adding to said register of credits available the payoff associated with the winning hand in said payoff table.

10. The device of claim 9 wherein said instructions further comprise:

receiving from said player a plurality of separate game wagers for a plurality of game hands;

dealing the same initial hand of playing cards from the commingled subdecks of playing cards included in said composite deck for each game hand on which a game wager has been received;

retaining the same playing cards selected to be held for each game hand on which a game wager has been received;

dealing replacement cards for each game hand on which a game wager has been received, said replacement cards randomly selected from the commingled subdecks of playing cards included in said composite deck, said replacement cards for each game hand dealt from an independent composite deck depleted of the playing cards of said initial hand; and forming a final hand for each game hand on which a game wager has been received, each said final hand comprising the playing cards selected to be held in combination with the replacement cards dealt from the independent composite deck for that game hand;

comparing each final hand to the payoff table, including comparing the subdeck identifiers of the playing cards in each said final hand to the subdeck identifiers for said winning hands in said payoff table; and for each final hand that is a winning hand, issuing a reward to said player by adding to said register of credits available the payoff associated with the winning hand in said payoff table.

* * * * *